(12) United States Patent
Lefebvre et al.

(10) Patent No.: US 7,643,034 B2
(45) Date of Patent: Jan. 5, 2010

(54) SYNTHESIS OF ADVECTING TEXTURE USING ADAPTIVE REGENERATION

(75) Inventors: Sylvain Lefebvre, La Fouillouse (FR); Hugues H. Hoppe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 11/428,355

(22) Filed: Jun. 30, 2006

(65) Prior Publication Data

US 2008/0001963 A1 Jan. 3, 2008

(51) Int. Cl.
G09G 5/00 (2006.01)
(52) U.S. Cl. ...................................... 345/582
(58) Field of Classification Search ................ None
See application file for complete search history.

(56) References Cited

U.S. PATENT DOCUMENTS

| | | | |
|---|---|---|---|
| 5,097,427 A | 3/1992 | Lathrop et al. |
| 5,388,517 A | 2/1995 | Levien |
| 5,459,586 A | 10/1995 | Nagasato et al. |
| 5,471,572 A | 11/1995 | Buchner et al. |
| 5,680,528 A | 10/1997 | Korszun |
| 5,740,277 A | 4/1998 | Katto |
| 5,774,129 A | 6/1998 | Poggio et al. |
| 5,784,498 A | 7/1998 | Venable |
| 5,872,867 A | 2/1999 | Bergen |
| 5,974,198 A | 10/1999 | Hamburg et al. |
| 6,075,905 A | 6/2000 | Herman et al. |
| 6,185,342 B1 | 2/2001 | Hamburg et al. |
| 6,392,655 B1 | 5/2002 | Migdal |
| 6,525,744 B1 | 2/2003 | Poggio et al. |
| 6,593,933 B1 | 7/2003 | Xu |
| 6,700,585 B2 | 3/2004 | Ritter |

(Continued)

FOREIGN PATENT DOCUMENTS

JP 9044655 2/1997

(Continued)

OTHER PUBLICATIONS

Adelson, E. H., C. H. Anderson, J. R. Bergen, P. J. Burt and J. M. Ogden, Pyramid methods in image processing, RCA Engineer, Nov./Dec. 1984, pp. 33-41, vol. 29, No. 6.

(Continued)

*Primary Examiner*—Peter-Anthony Pappas
*Assistant Examiner*—Said Broome
(74) *Attorney, Agent, or Firm*—Lyon & Harr, L.L.P.; Craig S. Fischer

(57) ABSTRACT

An adaptive texture regeneration method and system for generating a sequence of images over time (an animation sequence) that gives the appearance of texture flowing over a surface. The adaptive texture regeneration method and system helps keep synthesized texture flow over a surface from becoming so distorted such that it no longer resembles the original exemplar. This is achieved in part by using pixel coordinates instead of colors. By using pixel coordinates, distortion of the texture can be measured. Based on this distortion measurement, the texture can be adaptively regenerated if necessary. The distortion measurement of the texture is measured and compared to a distortion threshold. If the measured distortion does not exceed the threshold, then the current synthesized texture is retained. On the other hand, if the measured distortion exceeds the threshold, the current synthesized texture is regenerated.

15 Claims, 6 Drawing Sheets

U.S. PATENT DOCUMENTS

| | | | |
|---|---|---|---|
| 6,762,769 | B2 | 7/2004 | Guo |
| 6,888,544 | B2 | 5/2005 | Malzbender et al. |
| 6,965,694 | B2 | 11/2005 | Ueda et al. |
| 6,999,095 | B2 | 2/2006 | Wang et al. |
| 7,002,591 | B1 | 2/2006 | Leather et al. |
| 7,034,841 | B1 | 4/2006 | Weiblen et al. |
| 7,088,375 | B1 | 8/2006 | Hamburg |
| 2002/0122043 | A1 | 9/2002 | Freeman |
| 2002/0158888 | A1 | 10/2002 | Kitsutaka |
| 2002/0171660 | A1 | 11/2002 | Lao |
| 2003/0164838 | A1* | 9/2003 | Guo et al. .................. 345/582 |
| 2003/0179923 | A1 | 9/2003 | Xiong |
| 2003/0189579 | A1 | 10/2003 | Pope |
| 2003/0206176 | A1 | 11/2003 | Ritter |
| 2004/0075666 | A1 | 4/2004 | Ritter |
| 2004/0096120 | A1 | 5/2004 | Tong |
| 2004/0155887 | A1 | 8/2004 | Kitsutaka |
| 2004/0165787 | A1 | 8/2004 | Perez et al. |
| 2004/0233211 | A1 | 11/2004 | Wang |
| 2004/0234159 | A1 | 11/2004 | Wang |
| 2005/0007378 | A1 | 1/2005 | Grove |
| 2005/0013509 | A1 | 1/2005 | Samadani |
| 2005/0231519 | A1 | 10/2005 | Solanki et al. |
| 2005/0253863 | A1 | 11/2005 | Mitchell et al. |
| 2006/0001679 | A1 | 1/2006 | Hamburg |
| 2006/0028481 | A1 | 2/2006 | Zhang et al. |

FOREIGN PATENT DOCUMENTS

| | | |
|---|---|---|
| WO | WO2004055724 | 7/2004 |

OTHER PUBLICATIONS

Ashikhmin, M., Synthesizing Natural Textures, Proceedings of 2001 ACM Symposium on Interactive 3D Graphics, Research Triangle Park, North Carolina Mar. 19-21, pp. 217-226.

Bar-Joseph, Z., R. El-Yaniv, D. Lischinski, and M. Werman, Texture mixing and texture movie synthesis using statistical learning, IEEE TVCG, 2001, vol. 7 No. 2, pp. 120-135.

Burt, P. J., E. Adelson, The Laplacian Pyramid as a compact image code, IEEE Transactions on Communications, Apr. 1983, vol. com-31 No. 4, pp. 532-540.

Cohen, M., J. Shade, S. Hiller, and O. Deussen, 2003, Wang tiles for image and texture generation, ACM SIGGRAPH, pp. 287-294.

Cula, O.G. and K. J. Dana, Recognition Methods for 3D Textured Surfaces, available at http://www.ece.rutgers.edu/~kdana/research/spie01.pdf.

De Bonet, J., Multiresolution sampling procedure for analysis and synthesis of texture images, ACM SIGGRAPH, pp. 341-346.

Efros, A., and T. Leung, Texture synthesis by non-parametric sampling, ICCV, 1999, pp. 1033-1038.

Fatahalian, K., Real-Time Global Illumination of Deformable Objects, available at: http://graphics.stanford.edu/~kayvonf/papers/seniorthesis03.pdf.

Garber, D., Computational Models for Texture Analysis and Texture Synthesis. PhD thesis, University of Southern California, 1981.

Gralewski, L., N. Campbell, Statistical synthesis of facial expressions for the portrayal of emotion available at http://delivery.acm.org/10.1145/990000/988867/p190-gralewski.pdf?key1=988867&key2=9951194411&coll= GUIDE&dl=GUIDE&CFID=69372413&CFTOKEN=85977336.

Hertzmann, A., C. Jacobs, N. Oliver, B. Curless and D. Salesin, Image analogies, ACM SIGGRAPH, 2001, pp. 327-340.

Hertzmann, A., and D. Zorin, Illustrating smooth surfaces, ACM SIGGRAPH, 2000, pp. 517-526.

Kwatra, V., I. Essa, A. Bobick, and N. Kwatra, Texture optimization for example-based synthesis, ACM SIGGRAPH, 2005, pp. 795-802.

Kwatra, V., A. Schödl, I. Essa, G. Turk, and A. Bobick, Graphcut textures: image and video synthesis using graph cuts, in ACM SIGGRAPH, 2003, pp. 277-286.

Lai, Y.-K., S.-M. Hu, D. Gu, and R. Martin, Geometric texture synthesis and transfer via geometry images, Proc. of SMA, 2005, pp. 15-26.

Lefebvre, S., and H. Hoppe, Parallel controllable texture synthesis, ACM SIGGRAPH, 2005, pp. 777-786.

Lefebvre, S., and F. Neyret, Pattern based procedural textures, Symposium and Interactive 3D Graphics, 2003, pp. 203-212.

Leung, T., and Malik, J., Representing and recognizing the visual appearance of materials using three-dimensional textons, IJCV, vol. 43, No. 1, 2001, pp. 29-44.

Liang, L., C. Liu, Y. Xu, B. Guo, and H.-Y. Shum, Real-time texture synthesis by patch-based sampling, 2001, ACM TOG, vol. 20, No. 3, 127-150.

Liu, Y., W.-C. Lin, and J. Hays, Near-regular texture analysis and manipulation, ACM SIGGRAPH, 2004, pp. 368-376.

Liu, Y., Y. Tsin, and W.-C. Lin, The promise and peril of near-regular texture, IJCV, vol. 62, No. 1-2, pp. 149-159.

Magda, S., and D. Kriegman, Fast texture synthesis on arbitrary meshes, Eurographics Symposium on Rendering, 2003, pp. 82-89.

Malik, J., S. Belongie, J. Shi, and T. Leung, Textons, contours and regions: Cue integration in image segmentation, ICCV, 1999, pp. 918-925.

Neyret, F., and M.-P. Cani, Pattern-based texturing revisited, ACM SIGGRAPH, 1999, pp. 235-242.

Neyret, F., Advected textures, Symposium on computer animation, 2003, pp. 147-153.

Popat, K., and Picard, R., Novel cluster-based probability model for texture synthesis, classification, and compression, Visual Communications and Image Processing, 1993, pp. 756-768.

Praun, E., A. Finkelstein, and H. Hoppe, Lapped textures, ACM SIGGRAPH, 2000, pp. 465-470.

Roweis, S., EM algorithms for PCA and SPCA, NIPS, 1997, pp. 626-632.

Roweis, S., and L. Saul, Nonlinear dimensionality reduction by locally linear embedding. Science, 2000, vol. 290, pp. 2323-2326.

Sloan, P.-P., Liu, X. H.-Y. Shum and J. Snyder, Bi-scale radiance transfer, ACM SIGGRAPH, 2003, pp. 370-375.

Soler, C., M.-P. Cani, and A. Angelidis, Hierarchical pattern mapping, ACM SIGGRAPH, 2002, pp. 673-680.

Tanner, C., C. Migdal, and M. Jones, The clipmap: a virtual mipmap, ACM SIGGRAPH, 1998, pp. 151-158.

Tenenbaum, J., V. de Silva, and J. Langford, A global geometric framework for nonlinear dimensionality reduction, Science, 2000, vol. 290, pp. 2319-2323.

Tong, X., J. Zhang, L. Liu, X. Wang, B. Guo and H.-Y. Shum, Synthesis of bidirectional texture functions on arbitrary surfaces, 2002, ACM SIGGRAPH, pp. 665-672.

Tonietto, L., and M. Walter, Towards local control for image-based texture synthesis, Proceedings of the 15th Brazilian Symposium on Comp. Graphics and Image Processing SIBGRAPHI, 2002, pp. 252-258.

Turk, G., Texture synthesis on surfaces, ACM SIGGRAPH, 2001, pp. 347-354.

Turk, G., Generating textures on arbitrary surfaces using reaction-diffusion, Proceedings of the 18th Annual Conf. on Comp. Graphics and Interactive Techniques, 1991, pp. 289-298.

Wang, L., X. Gu, K. Mueller and S.-T. Yau, Uniform texture synthesis and texture mapping using global parameterization, J. The Visual Comp., pp. 801-810.

Wei, L.-Y. and M. Levoy, Fast texture synthesis using tree-structured vector quantization, ACM SIGGRAPH, 2000, pp. 479-488.

Wei, L.-Y., and M. Levoy, Texture synthesis over arbitrary manifold surfaces, ACM SIGGRAPH, 2001, pp. 355-360.

Wei, L.-Y. and M. Levoy, Order-independent texture synthesis, http://graphics.stanford.edu/papers/texture-synthesis-sig03/, Rejected from SIGGRAPH 2003.

Wei, L.-Y., Tile-based texture mapping on graphics hardware, Graphics Hardware, 2004, pp. 55-64.

Wu, Q., and Y. Yu, Feature matching and deformation for texture synthesis, ACM SIGGRAPH, 2004, pp. 362-365.

Ying, L., A. Hertzmann, H. Biermann, and D. Zorin, Texture and shape synthesis on surfaces, Eurographics Workshop on Rendering, 2001, pp. 301-312.

Zalesny, A., V. Ferrari, G. Caenen, and L. Van Gool, Composite texture synthesis, IJCV, 2005. vol. 62, No. 1-2, pp. 161-176.

Zhang, J., K. Zhou, L. Velho, B. Guo, and H.-Y. Shum, Synthesis of progressively-variant textures on arbitrary surfaces, 2003, ACM SIGGRAPH, pp. 295-302.

Co-pending U.S. Appl. No. 11/172,594, Sub-pass correction using neighborhood matching, filed Jun. 30, 2005.

Co-pending U.S. Appl. No. 11/171,920, Multi-level image stack of filtered images, filed Jun. 30, 2005.

Co-pending U.S. Appl. No. 11/171,923, Magnification of indirection textures, filed Jun. 30, 2005.

Co-pending U.S. Appl. No. 11/174,231, Parallel texture synthesis by unsampling pixel coordinates, filed Jun. 30, 2005.

Co-pending U.S. Appl. No. 11/172,593, Parallel texture synthesis having controllable jitter, filed Jun. 30, 2005.

Co-pending U.S. Appl. No. 11/426,564 Texture synthesis using dimensionality-reduced appearance space, filed Jun. 26, 2006.

Co-pending U.S. Appl. No. 11/428,311 Anisometric texture synthesis, filed Jun. 30, 2006.

Aaron M. Guertin, Office Action, U.S. Appl. No. 11/172,593, Mailed Sep. 13, 2007.

Aaron M. Guertin, Office Action, U.S. Appl. No. 11/172,594, Mailed Oct. 15, 2007.

Stephen R. Koziol, Office Action, U.S. Appl. No. 11/171,920, Mailed Sep. 19, 2007.

Wesner Sajous, Office Action, U.S. Appl. No. 11/171,923, Mailed Aug. 24, 2007.

* cited by examiner

SYNTHESIS OF ADVECTING TEXTURE USING ADAPTIVE REGENERATION

BACKGROUND

Texture synthesis involves automatically generating large textures from a small example image (known as a texture sample or exemplar). This exemplar-based texture synthesis takes an exemplar and generates additional content based on that exemplar to create much more content than is contained in the exemplar. Exemplar-based texture synthesis alleviates the need to store explicitly an entire expanse of content. Instead, the content is generated "on the fly" from the much smaller exemplar.

Traditionally, exemplar-based texture synthesis includes a correction process that compares neighborhoods of each synthesized pixel with neighborhoods of the exemplar. The synthesized pixels then are modified to recreate synthesized neighborhoods that are compatible with the exemplar content. For each pixel, the best matching neighborhood is found, and then the current pixel is replaced with the best-matching pixel. The best-matching neighborhood is determined by comparing pixel colors in a small grid of pixels. For example, for each pixel, a 5×5 neighborhood of pixels may be examined, and the error of the neighborhood is the sum of the errors of the red, green, and blue (RGB) color vectors of individual pixels in the 5×5 neighborhood.

An important application for exemplar-based texture synthesis is the generation of surface texture. Some types of surface texture synthesis include a zero velocity field, whereby the texture is stationary on the surface. Other types of surface texture synthesis techniques include synthesizing texture in space-time with a non-zero velocity field. This gives the appearance of the texture "flowing" over the surface over time. This type of non-zero velocity field texture synthesis is called texture advection.

Texture advection utilizes an exemplar and a velocity field. The velocity field is a collection of vectors specified over a synthesized image. Specifically, the velocity field specifies a velocity vector for each pixel in the synthesized image. Applications for texture advection include texture-based flow visualization and textured animated fluids, such as water, foam, or lava.

The challenge of texture advection is to maintain both spatial and temporal continuity in the advecting texture without the introduction of blurring or ghosting. In other words, it is desirable to have each frame of the animation have the quality of a still synthesized image. Thus, the challenge in texture advection is to move the texture according to a velocity field, while also having the texture in any time frame look visually similar to the given exemplar texture.

One texture advection technique blends several advecting layers of texture that are regenerated periodically out-of-phase, and reduces ghosting by adapting the blend weights to the accumulated texture deformation. Another technique uses the color synthesis of a previous time frame as a soft constraint. In particular, the technique runs an optimization process to do synthesis, and the goal is to make the current synthesis results be as close as possible to the predicted result from the previous time frame. In order to synthesize the next frame, the previous result is warped using the vector field and used as a soft constraint to the texture synthesis optimization. If only the previous result are warped using the vector field, a texture is obtained where the texture elements can be deformed. This deformation becomes progressively worse over time. This prediction is used as a soft constraint for synthesis so that the synthesis can recreate a "clean" texture with undeformed texture elements. Thus, the use of a soft constraint encourages the newly synthesized texture to be aligned with the texture advected from the previous frame.

One drawback to the last technique is that it requires use of a complicated optimization process. Moreover, there is the possibility of coherence loss. Coherence loss can occur because the optimization process is started from scratch in the current time frame, and then tries to rematch the new constraint.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The adaptive texture regeneration method and system includes generating a sequence of images over time (an animation sequence) that give the appearance of texture flowing over a surface. The adaptive texture regeneration method and system helps ensure that a synthesized texture flow over a surface does not become so distorted such that it no longer resembles the original exemplar. One of the causes of this distortion is using a synthesized texture in a previous time frame to predict a current synthesized texture in a current time frame. One way in which the adaptive texture regeneration method and system addresses this problem is by measuring distortion and adaptively regenerate the texture based on the distortion measurement. The distortion of the current synthesized texture is measured and compared to a distortion threshold. If the measured distortion does not exceed the threshold, then the current synthesized texture is retained. On the other hand, if the measured distortion exceeds the threshold, the current synthesized texture is regenerated.

The adaptive texture regeneration method and system uses pixel coordinates instead of colors. By using the pixel coordinates, distortion can be measured. In addition, the adaptive texture regeneration method and system can easily advect 'in-place' from the previous time frame. By "in-place" advection, it is meant that the adaptive texture regeneration method and system adds the velocity vector to the coordinate of the pixel at the previous time frame. This mitigates the need to warp the previous time frame result, as is required when using pixel colors.

The adaptive texture regeneration method and system avoids the use of complicated optimization processes and reduces coherence loss. This minimizes any blurring that a user may see otherwise. In addition, the adaptive texture regeneration method and system are approximately three orders of magnitude faster than current texture advection techniques.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of the adaptive texture regeneration method and system, reference is made to the accompanying drawings, which form a part thereof, and in which is shown by way of illustration a specific example whereby the adaptive texture regeneration method and system may be practiced. It is to be understood that other embodiments may be utilized and structural changes may be made without departing from the scope of the claimed subject matter.

I. System Overview

Figure 1:
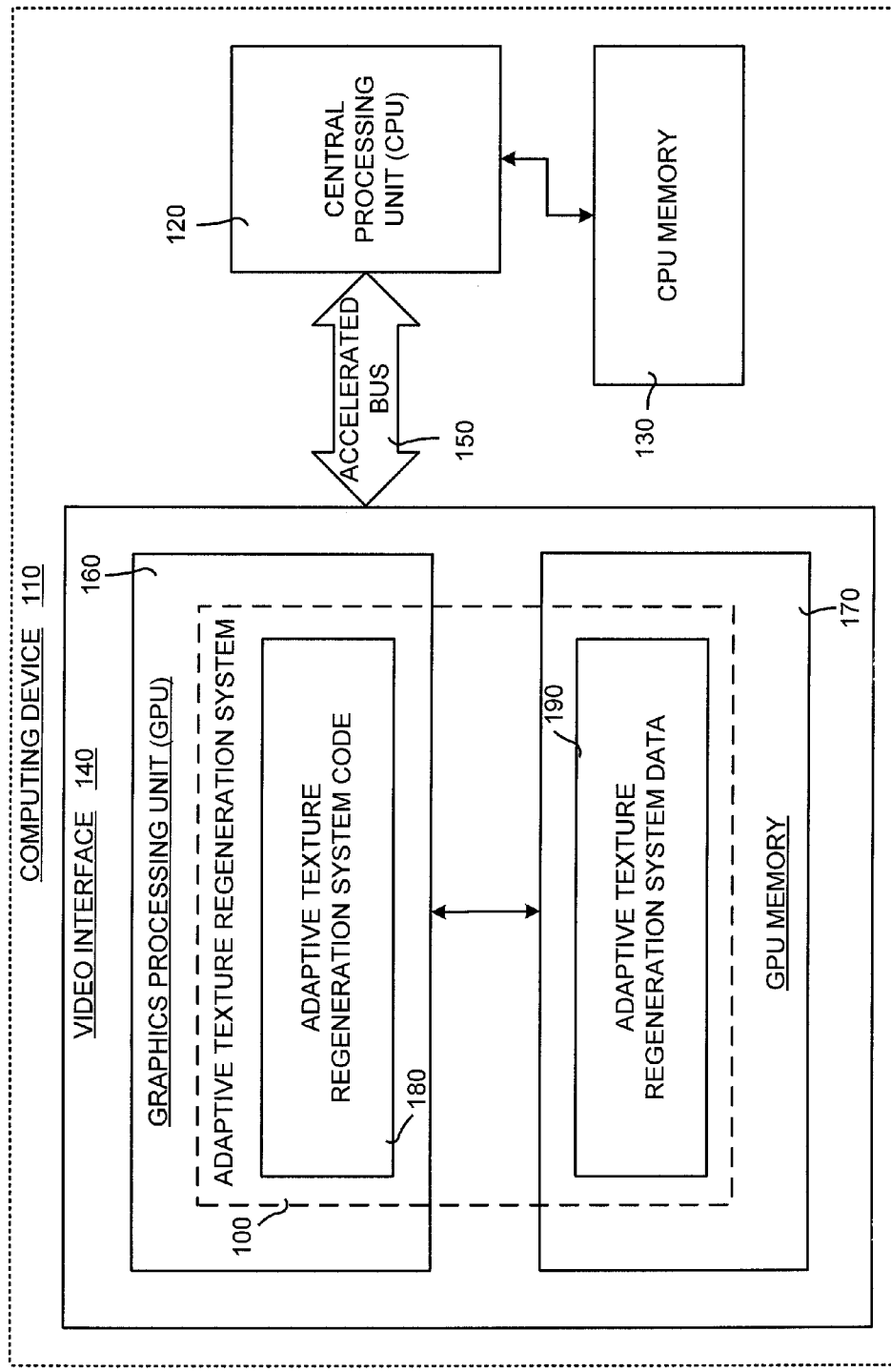
FIG. 1 is a block diagram illustrating an exemplary implementation of the adaptive texture regeneration system disclosed herein.

FIG. 1 is a block diagram illustrating an exemplary implementation of the adaptive texture regeneration system disclosed herein. It should be noted that FIG. 1 is merely one of several ways in which the adaptive texture regeneration system may be implemented and used. The adaptive texture regeneration system may also be implemented on other types of processing systems, such as on a central processing unit (CPU) or multi-core processing systems.

Referring to FIG. 1, the adaptive texture regeneration system 100 is designed to run on a computing device 110 (shown by a dotted line). It should be noted that the adaptive texture regeneration system 100 may be run on numerous types of general purpose or special purpose computing system environments or configurations, including personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The computing device 110 shown in FIG. 1 is merely meant to represent any one of these and other types of computing system environments or configurations.

As shown in FIG. 1, the computing device 110 contains a central processing unit (CPU) 120 and a CPU memory 130. The CPU 120 is in communication with a video interface 140 through an accelerated bus 150. By way of example and not limitation, this bus 150 may be an Accelerated Graphics Port (AGP) or a PCI Express, which are designed especially for the throughput demand of 3-D graphics.

The video interface 140 includes a graphics processing unit (GPU) 160 and a GPU memory 170. The GPU 160 is designed to accelerate real-time 3-D graphics display. The GPU 160 is capable of transferring data to the CPU 120 over the bus 150. The adaptive texture regeneration system 100 is also in communication with the GPU 160 and the GPU memory 170. The adaptive texture regeneration system 100 is shown in FIG. 1 by the dashed lines. In the implementation shown in FIG. 1, the system 100 includes adaptive texture regeneration system code 180 residing on the GPU 160, and adaptive texture regeneration system data 190 residing in the GPU memory 170.

II. Operational Overview

Figure 2:
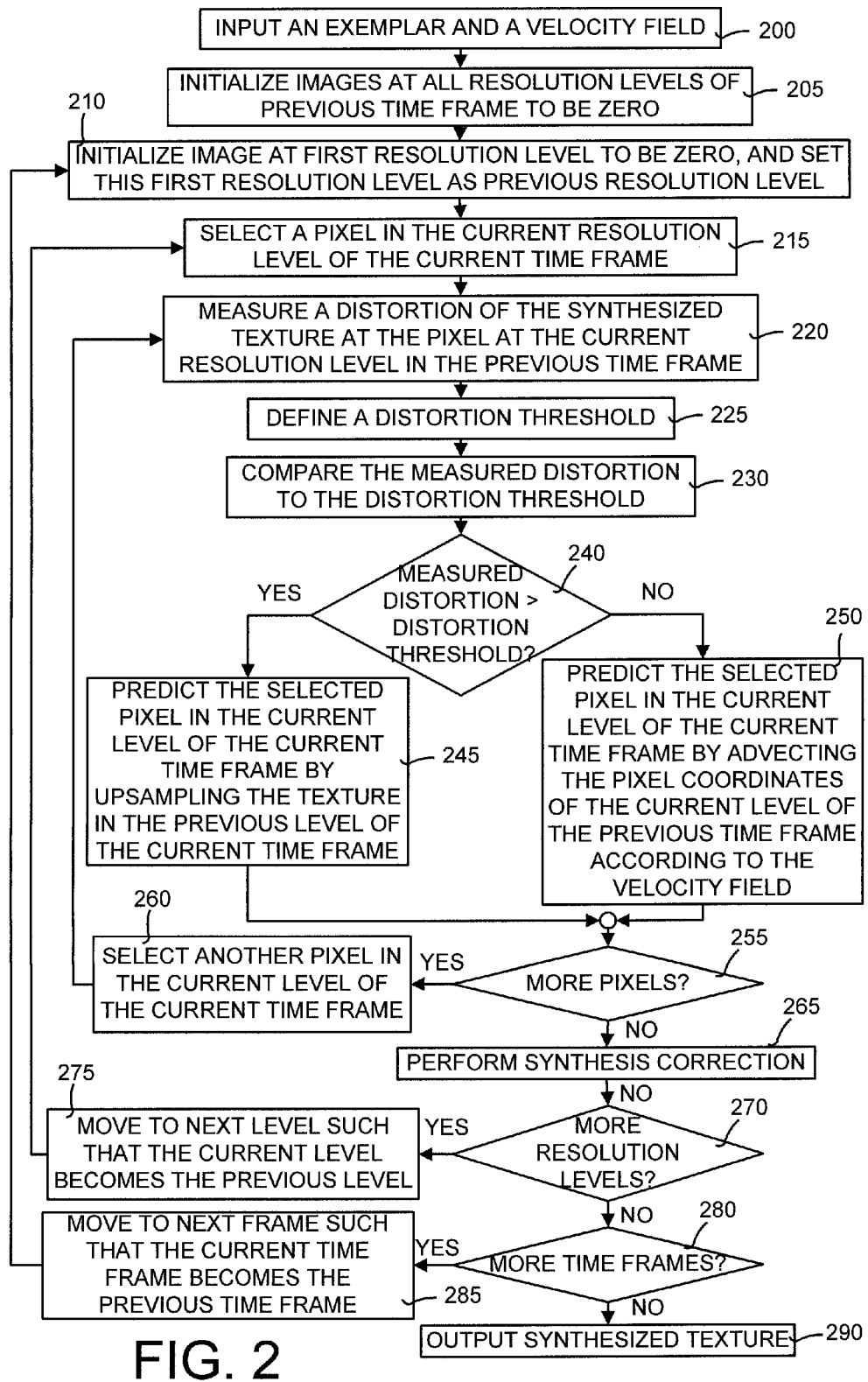
FIG. 2 is a flow diagram illustrating the operation of the adaptive texture regeneration system shown in FIG. 1.

FIG. 2 is a flow diagram illustrating the operation of the adaptive texture regeneration system 100 shown in FIG. 1. In general, the adaptive texture regeneration method measures a distortion of a synthesized texture in a current time frame, and, based on that measured distortion, selectively regenerates the synthesized texture if necessary. Regeneration is necessary if warranted after comparison to a distortion threshold. For example, in some embodiments if the measured distortion is greater than the distortion threshold then regeneration is performed.

The basic procedure is to use a synthesized texture from a previous time frame, and use this texture to predict a synthesized texture in the current time frame (the time frames should be adjacent time frames). As explained below, this is achieved using a process of advection, which means that the previous texture is used as a starting point and it is made to "flow" according to the velocity field.

More specifically, the adaptive texture regeneration method inputs both an exemplar and a velocity field (box 200). In other words, an exemplary and a velocity vector are the inputs at each point of the synthesized texture. It should be noted that the velocity vectors are defined at each point in the synthesized texture. The exemplar is used to generate synthesized texture using an iterative synthesis process. It is common in texture synthesis to use a multiresolution coarse-to-fine iterative process to generate the synthesized texture. This iterative process begins by upsampling pixel coordinates of the image at the previous resolution level. In the first iteration, the upsampled image is an initialization image. At subsequent iterations the image to be upsampled is the output of the previous iteration. The upsampling generates a current resolution level having a finer resolution level than the previous resolution level. In other words, in the coarse-to-fine pyramid used in the multi-resolution approach, the resolution levels become progressively finer with successive iterations. The adaptive texture regeneration method initializes to zero images at all resolution levels of the previous time frame (box 205). In addition, the adaptive texture regeneration method initializes an image at a first resolution level of the multi-resolution process to be zero, such that the first resolution level becomes the previous resolution level (box 210).

A pixel is selected in the current resolution level of the current time frame (box 215). Next, for each pixel in the image and at each resolution level, a distortion of the synthesized texture at the pixel at the current resolution level in the previous time frame is measured (box 220). A distortion threshold, which indicates the maximum allowable distortion, then is defined (box 225). The measured distortion is compared to the distortion threshold (box 230). In some embodiments, a determination is made as to whether the measured distortion is greater than the distortion threshold (box 240).

Next, a prediction of the selected pixel is made in one of two ways, based on the results of the determination in box 240. In general, the two ways are a prediction made by upsampling from the previous iteration, or a prediction made by advecting the pixel coordinates of the previous time frame result.

In particular, if the measured distortion is greater than the distortion threshold, then a prediction is made of the selected pixel in the current level of the current time frame (box 245). This prediction is made by upsampling the texture in the previous level of the current time frame (box 245). If the measured distortion is not greater than the distortion threshold, then a prediction also is made of the selected pixel in the current level off the current time frame. However, in this case the prediction is made by advecting the pixel coordinates of the current level result of the previous time frame according to the velocity field (box 250).

A determination then is made as to whether there are more pixels to process at the current level of the current time frame (box 255). If so, then another pixel in the current resolution level of the current time frame is selected (box 260). The process of processing the pixel as stated above with regard to boxes 220 to 255 then begins again. If there are no more pixels at the current level of the current time frame, then synthesis correction is performed (box 265). This correction process involves comparing the neighborhoods of the candidates with the neighborhood computed for the current pixel. Note that all these neighborhoods are in undistorted exemplar space.

Another determination then is made as to whether there are more resolution levels at the current time frame (box 270). If so, then the method moves to the next resolution level such that the current resolution level becomes the previous resolution level (box 275). The iterative process involving boxes 215 to 270 then begins anew.

If there are no more resolution levels at the current time frame, then another determination is made as to whether there are any more time frames (box 280). If so, then the method moves to the next time frame such that the current time frame becomes the previous time frame (box 285). The iterative process for the time frames involving boxes 210 to 280 then begins again. If there are no more time frames, then the method outputs a synthesized texture (box 290).

Figure 3:
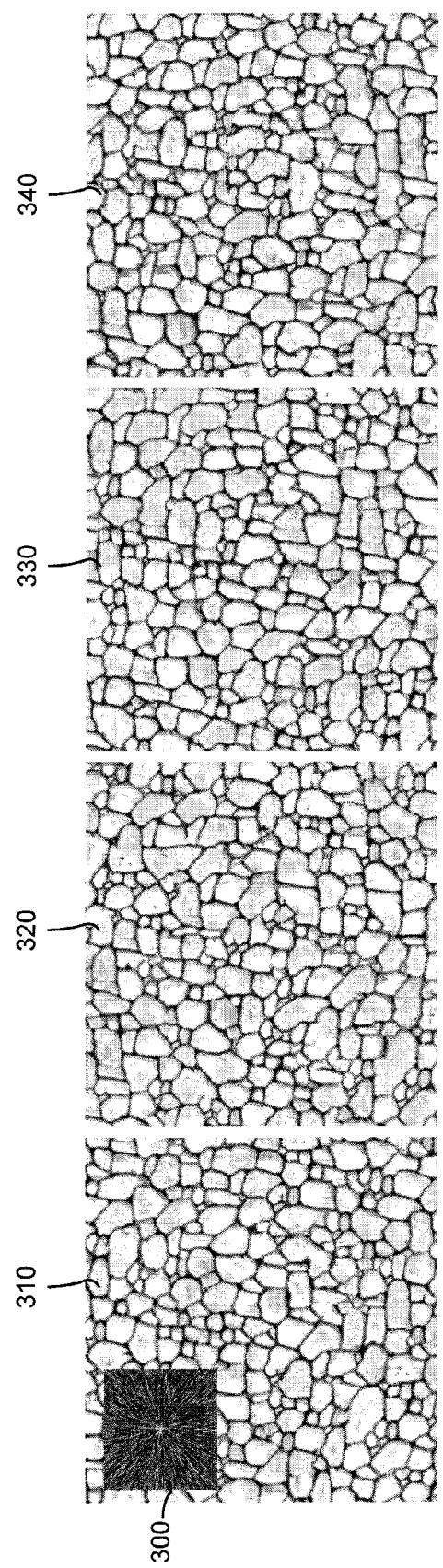
FIG. 3 illustrates a first example of the adaptive texture regeneration method shown in FIG. 2.

FIG. 3 illustrates a first example of the adaptive texture regeneration method shown in FIG. 2. In this first example, the texture advection is in a 2-D plane. A first velocity field 300 is shown that visually represents the direction of the flow field. The "flow" lines of the velocity field 300 reveal the direction of the first velocity field 300. In this example, the velocity vectors all are pointing away from a special point (called a "source") in the center of the synthesized image. At a first time frame 310, a second time frame 320, a third time frame 330, and a fourth time frame 340, it can be seen that the synthesized texture in the plane preserves an appearance similar to an exemplar (not shown) used to synthesize the texture. Each of the time frames is successively later in time.

Figure 4:
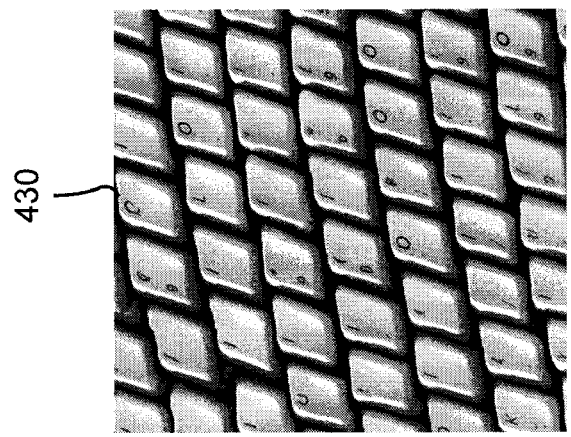
FIG. 4 illustrates a second example of the adaptive texture regeneration method shown in FIG. 2.
Figure 4:
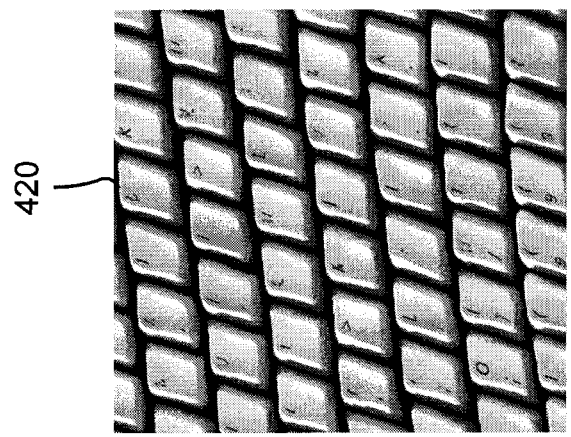
Figure 4:
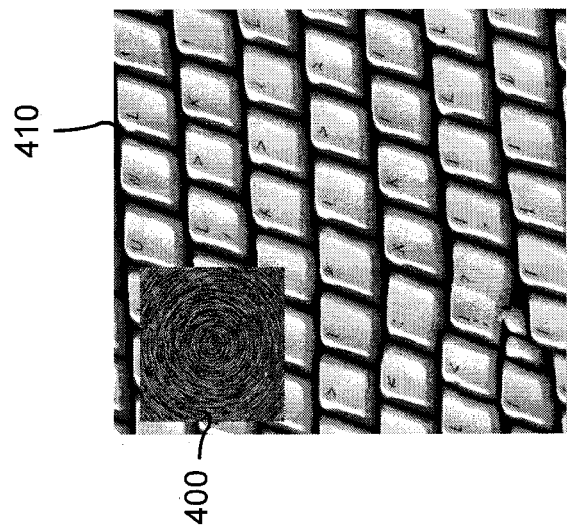

FIG. 4 illustrates a second example of the adaptive texture regeneration method shown in FIG. 2. In this second example, the texture advection also is in a 2-D plane. A second velocity field 400 is shown that corresponds to a counter-clockwise rotation about a "swirl" point. At a first time frame 410, a second time frame 420, and a third time frame 430, the synthesized texture in the plane preserves an appearance similar to the exemplar. Each of the time frames is successively later in time. Due to the second velocity field 400 having a counter-clockwise rotation, it can be seen that in the second time frame 420 and the third time frame 430 the keys are progressively being rotated in a counter-clockwise movement.

Figure 5:
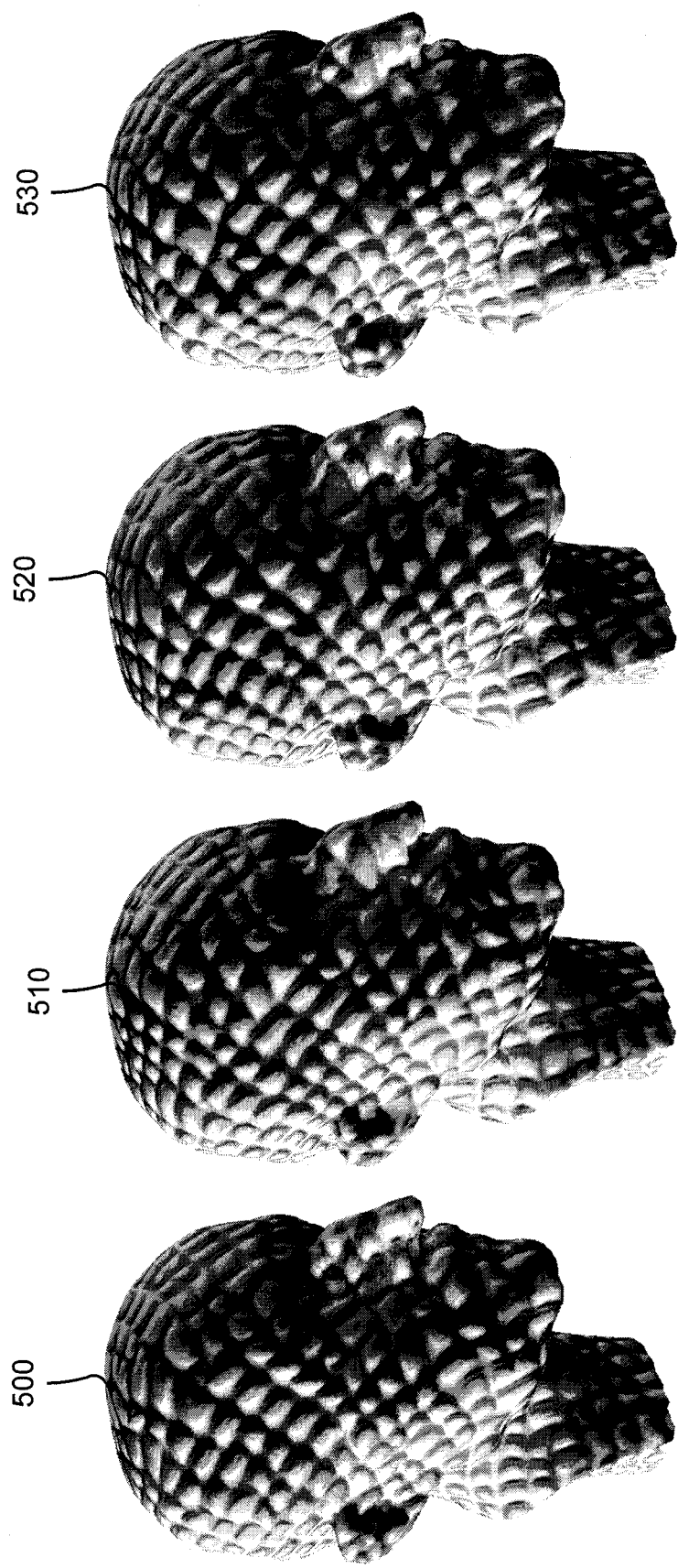
FIG. 5 illustrates a third example of the adaptive texture regeneration method shown in FIG. 2.

FIG. 5 illustrates a third example of the adaptive texture regeneration method shown in FIG. 2. In this example, the texture is in 2-D on a surface. At each of the time frames 500, 510, 520, 530, (which are successively later in time), it can be seen that the texture is not blurred, even though the texture is moving over the surface.

III. Operational Details

The details of the adaptive texture regeneration method will now be discussed. Given a velocity field V(p) at a point, p, in domain D, the synthesized coordinates of a previous frame t−1 are advected to obtain the result at the current frame t. This is given by the equation:

$$S^t[p] := S^{t-1}[p] + J(p)V(p). \qquad (1)$$

Unlike current texture advection techniques, which warp colors, the adaptive texture regeneration method starts off by replacing synthesized coordinates according to equation (1). At the previous time frame $S^{t-1}$, and at each pixel, p, the synthesized coordinate in the previous time frame is obtained. The velocity field at each point V(p) then is added to the coordinates. These synthesized coordinates from the previous time frame are used as an initial prediction of the synthesized coordinates in a current time frame.

In equation (1), there is both the Jacobian field at a point, J(p), and the velocity field at a point, V(p). In some embodiments, the Jacobian field is omitted. In these embodiments where the Jacobian is not used, the Jacobian, J(p), is set to an identity matrix. In addition, the embodiments where the Jacobian is not the identity matrix, the correction process of synthesis is modified to handle the Jacobian field, as is known in the art.

At this point the adaptive texture regeneration method has predicted what the current synthesized texture should look like in the current time frame. Transforming the synthesized coordinates creates a temporally smooth result. However, eventually the texture gradually distorts in areas of flow divergence. This is because over time the texture flow over the surface does not keep moving at the same rate. This causes flow divergence, and leads to the current synthesized texture deforming such that it does not look at all like the original exemplar.

At some point, the current synthesized texture needs to be regenerated. The adaptive texture regeneration method performs this regeneration in an adaptive manner. In other words, the adaptive texture regeneration method only regenerates texture when the distortion of the current synthesized texture exceeds a certain distortion threshold. Regeneration is obtained by using upsampling from the parent pixels in order to locally refresh the texture content. However, this increases temporal discontinuities. As a tradeoff between temporal coherence and exemplar fidelity, the adaptive texture regeneration method upsamples from the coarser resolution level only in areas where the distortion of the synthesized texture exceeds a threshold.

In some embodiments, the distortion is measured using a Frobenius error norm. In general, the Frobenius error norm is a measure of the magnitude of a matrix. More specifically, the Frobenius norm, $\xi = \|J_S - J\|_2$, is a measure between the Jacobian, $J_S = (ddx(S)\ ddy(S))$, of the current synthesized texture, S, and the desired anisometric Jacobian J. The matrix is the difference between the measured Jacobian of the synthesized texture and the desired Jacobian of the texture. The desired Jacobian is the identity matrix for isometric synthesis. Otherwise, the desired Jacobian is an arbitrary matrix that expresses a desired orientation and scale. This desired orientation and scale is unrelated to the velocity field. In some embodiments, the Jacobian can be measured by taking finite differences between the points in the current synthesized texture. Essentially, a difference between the synthesized coordinates and adjacent samples in one row is used. The difference is an estimate of the derivative (ddx(S)) of the synthesized coordinates along an x-axis. The other derivative (ddy(S)) is an estimate of the derivative of the synthesized coordinates along the y-axis. It should be noted that when implemented on a GPU (as shown in FIG. 1), the GPU may have built-in instructions on the hardware that allows the ddx and ddy processes to be done quickly. Once the Jacobian the synthesized image, $J_S$, has been estimated, it is compared with, J, the desired Jacobian. Note that if no J is specified, then J is the identity matrix.

The adaptive texture regeneration method measures the distortion in the previous time frame result. The Frobenius norm is used to measure the distortion at a given pixel location. This measure distortion is compared to the distortion threshold. In some embodiments, if the measured distortion is greater than the distortion threshold, the current synthesized texture is regenerated by using coherent synthesis. In some embodiments, the distortion threshold is a constant threshold that is used to gauge or specify when the distortion is too high. In some embodiments, the distortion threshold is given as an input, while in other embodiments it is input by a user, such as through a graphical user interface.

The upsampling pass becomes:

$$S_l^t[p] := \begin{cases} S_l^{t-1}[p] + J(p)V(p), & \xi(p) < c \\ S_{l-1}^t[p - \Delta] + J(p)\Delta, & \text{otherwise.} \end{cases} \quad (2)$$

Equation (2) is states that if the distortion is small (which is the first line), the adaptive texture regeneration method takes the synthesized coordinates of the previous time frame and adds the velocity. This is performing advection of the coordinates.

On the other hand, if after comparison of the measured distortion to the distortion threshold it is found that the measured distortion is too large, then the adaptive texture regeneration method take the coordinates of the parent level in the current time frame and performs upsampling. This is shown as the second line of equation (2). The coordinates of the parent pixel in the current time frame are added to the relative child offset (the A is the relative child offset) and multiplied by the Jacobian. Thus, A is multiplied by the Jacobian and the result is added to the parent. It should be noted that, as an optimization, in some embodiments good advection results only require that the three to four finest synthesis levels be processed.

IV. Exemplary Operating Environment

The adaptive texture regeneration method and system is designed to operate in a computing environment. The following discussion is intended to provide a brief, general description of a suitable computing environment in which the adaptive texture regeneration method and system may be implemented.

Figure 6:
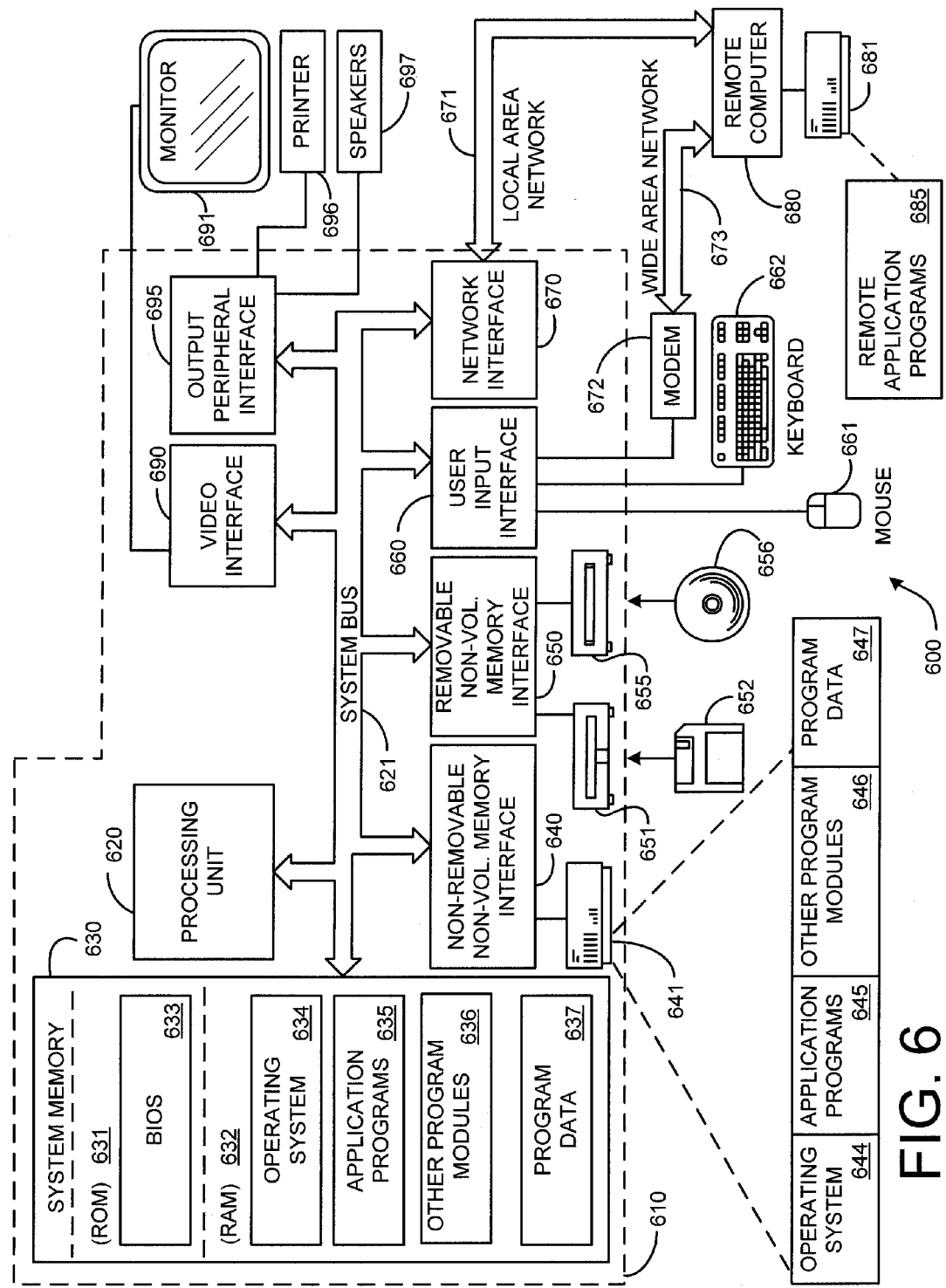
FIG. 6 illustrates an example of a suitable computing system environment in which the adaptive texture regeneration system and method may be implemented.

FIG. 6 illustrates an example of a suitable computing system environment in which the adaptive texture regeneration method and system may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment.

The adaptive texture regeneration method and system is operational with numerous other general purpose or special purpose computing system environments or configurations. Examples of well known computing systems, environments, and/or configurations that may be suitable for use with the adaptive texture regeneration method and system include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The adaptive texture regeneration method and system may be described in the general context of computer-executable instructions, such as program modules, being executed by a computer. Generally, program modules include routines, programs, objects, components, data structures, etc., that perform particular tasks or implement particular abstract data types. The adaptive texture regeneration method and system may also be practiced in distributed computing environments where tasks are performed by remote processing devices that are linked through a communications network. In a distributed computing environment, program modules may be located in both local and remote computer storage media including memory storage devices. With reference to FIG. 6, an exemplary system for the adaptive texture regeneration method and system includes a general-purpose computing device in the form of a computer 610.

Components of the computer 610 may include, but are not limited to, a processing unit 620 (such as a central processing unit, CPU), a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer readable media. Computer readable media can be any available media that can be accessed by the computer 610 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 610. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within the computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 620 through a user input interface 660 that is coupled to the system bus 621, but may be connected by other interface and bus structures, such as, for example, a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for synthesizing advecting texture on a surface, comprising:
   using a computing device having a processor to generate a synthesized texture image on the surface resembling a user given exemplar image;
   measuring a distortion of the synthesized texture image by measuring a Frobenius error norm of the synthesized texture image; and
   selectively regenerating the synthesized texture image based on the measured distortion to cause the synthesized texture to flow over the surface while preserving an appearance similar to the exemplar:
   wherein the Frobenius error norm is given by:

$$\xi = \|J_S - J\|_2,$$

where $\xi$ is the Frobenius norm, J is a desired anisometric Jacobian, $J_S$ is a Jacobian of a current synthesized texture, S, given by $J_S = (ddx(S)\ ddy(S))$, where $(ddx(S))$ is an estimate of a derivative of synthesized coordinates along an x-axis, and $(ddy(S))$ is an estimate of a derivative of the synthesized coordinates along a y-axis.

2. The method of claim 1, wherein the surface is a planar image domain.

3. The method of claim 1, wherein the surface is a polyhedral mesh in 3D.

4. The method of claim 1, further comprising:
   defining a velocity field that specifies the flow over the surface; and
   predicting the synthesized texture image by advecting pixel coordinates of a synthesized texture image at a previous time frame according to the velocity field.

5. The method of claim 1, further comprising:
   defining a distortion threshold; and
   regenerating the synthesized texture image if the measured distortion is greater than the distortion threshold.

6. The method of claim 5, further comprising causing a user to input the distortion threshold.

7. The method of claim 1, further comprising performing the selective regeneration on finest levels of a multi-level texture synthesis technique.

8. A computer-readable storage medium having stored and encoded thereon computer-executable instructions for adaptively regenerating synthesized texture on a surface, comprising:

predicting what the synthesized texture will look like on the surface at a current time frame;

measuring a Jacobian $J_S$, of the synthesized texture, S, given by $J_S=(ddx(S)\ ddy(S))$, where $(ddx(S))$ is an estimate of a derivative of synthesized coordinates along an x-axis and $(ddy(S))$ is an estimate of a derivative of the synthesized coordinates along a y-axis;

determining a desired Jacobian, J, of the synthesized texture;

comparing the measured Jacobian, $J_S$, and the desired Jacobian, J, to measure a distortion of the synthesized texture using a Frobenius error norm given by:

$$\xi = \|J_S - J\|_2;\text{ and}$$

regenerating the synthesized texture on the surface based on the comparison between the measured Jacobian and the desired Jacobian.

9. The computer-readable storage medium of claim 8, further comprising:

comparing the measure distortion to a threshold; and regenerating the synthesized texture on the surface if the measured distortion is greater than the threshold.

10. The computer-readable storage medium of claim 9, wherein the threshold is defined by a user.

11. A computer-implemented process for synthesizing a synthesized advecting texture on a surface at a current time frame, comprising:

inputting an exemplar, which is a small example image from which larger textures are automatically generated, and a velocity field, which specifies a flow over the surface;

using the computer having a processor to measure a distortion of the synthesized advecting texture at a pixel at a current resolution level in a previous time frame using a Frobenius error norm that is a measure of a magnitude of a matrix, wherein the Frobenius error norm is given by:

$$\xi = \|J_S - J\|_2,$$

where $\xi$ is the Frobenius norm, J is a desired anisometric Jacobian, $J_S$ is a Jacobian of a current synthesized texture, S, given by $J_S=(ddx(S)\ ddy(S))$, where $(ddx(S))$ is an estimate of a derivative of synthesized coordinates along an x-axis, and $(ddy(S))$ is an estimate of a derivative of the synthesized coordinates along a y-axis;

comparing the measured distortion to a distortion threshold; and outputting the synthesized texture on the surface the current time frame based on the comparison.

12. The computer-implemented process of claim 11, further comprising:

determining that the measured distortion is greater than the distortion threshold; and predicting the selected pixel in a current resolution level of the current time frame by upsampling the synthesized advecting texture in a previous resolution level of the current time frame.

13. The computer-implemented process of claim 11, further comprising:

determining that the measured distortion is less than the distortion threshold; and predicting the selected pixel in a current resolution level of the current time frame by advecting pixel coordinates of the current resolution level of the previous time frame according to the velocity field.

14. The computer-implemented process of claim 11, further comprising:

determining that there are additional pixels to be processed at the current resolution level and the current time frame; and selecting another pixel in the current level of the current time frame to obtain a selected pixel; and processing the selected pixel according to the process set forth above in claim 11.

15. The computer-implemented process of claim 11, further comprising:

determining that there are no additional pixels to be processed at the current resolution level and the current time frame; and performing synthesis correction that involves comparing pixel neighborhoods of candidates with a neighborhood computed for a current pixel;

wherein the neighborhoods are in undistorted exemplar space.

* * * * *

UNITED STATES PATENT AND TRADEMARK OFFICE
CERTIFICATE OF CORRECTION

PATENT NO.        : 7,643,034 B2                                                Page 1 of 1
APPLICATION NO.   : 11/428355
DATED             : January 5, 2010
INVENTOR(S)       : Sylvain Lefebvre et al.

It is certified that error appears in the above-identified patent and that said Letters Patent is hereby corrected as shown below:

In column 11, line 10, in Claim 8, delete "Jacobian" and insert -- Jacobian, --, therefor.

In column 12, line 2, in Claim 11, delete "$J_S$is" and insert -- $J_S$ is --, therefor.

Signed and Sealed this

Eighth Day of February, 2011

David J. Kappos
*Director of the United States Patent and Trademark Office*